(12) United States Patent
Feenstra et al.

(10) Patent No.: US 8,281,810 B2
(45) Date of Patent: Oct. 9, 2012

(54) DRY VALVE FOR SPRINKLER SYSTEM

(75) Inventors: Shawn J. Feenstra, Caledonia, MI (US); Vinh B. Hoa, Kentwood, MI (US)

(73) Assignee: The Viking Corporation, Hastings, MI (US)

( * ) Notice: Subject to any disclaimer, the term of this patent is extended or adjusted under 35 U.S.C. 154(b) by 381 days.

(21) Appl. No.: 12/419,726

(22) Filed: Apr. 7, 2009

(65) Prior Publication Data

US 2009/0272549 A1    Nov. 5, 2009

Related U.S. Application Data

(60) Provisional application No. 61/049,081, filed on Apr. 30, 2008.

(51) Int. Cl.
| | |
|---|---|
| F16K 31/122 | (2006.01) |
| F16K 31/126 | (2006.01) |
| F16K 1/12 | (2006.01) |
| F16K 7/17 | (2006.01) |
| F16K 51/00 | (2006.01) |
| A62C 35/62 | (2006.01) |
| A62C 35/64 | (2006.01) |

(52) U.S. Cl. ........... 137/614.2; 137/614.19; 137/220; 251/63.5; 251/284; 169/17; 169/20

(58) Field of Classification Search ........... 251/63, 251/63.5, 284; 137/614.2, 614.19, 219, 220, 137/217, 218; 169/17, 20, 21, 22
See application file for complete search history.

(56) References Cited

U.S. PATENT DOCUMENTS

| | | | |
|---|---|---|---|
| 515,410 A | | 2/1894 | Thomson |
| 733,962 A | * | 7/1903 | Hibbard ........................ 169/20 |
| 1,239,617 A | * | 9/1917 | Newcombe ................. 137/111 |
| 1,548,098 A | * | 8/1925 | Ward ....................... 137/543.15 |
| 2,251,422 A | | 8/1941 | Rider |
| 2,356,990 A | | 8/1944 | Getz |
| 2,380,459 A | * | 7/1945 | Niesemann ............. 137/315.05 |
| 2,592,259 A | * | 4/1952 | Eddy et al. ................. 137/113 |

(Continued)

FOREIGN PATENT DOCUMENTS

DE    3843064    6/1990

OTHER PUBLICATIONS

Viking Technical Data, Flow Control Valve Model H-1: Form No. F_082289 (Nov. 30, 2007), 10 pages.

*Primary Examiner* — Stephen M Hepperle
*Assistant Examiner* — Jonathan Waddy
(74) *Attorney, Agent, or Firm* — Harness, Dickey & Pierce, P.L.C.

(57) ABSTRACT

A dry valve is provided for a sprinkler system, including a housing including a valve body having an inlet end and a valve cover having an outlet end. A prime chamber housing is disposed within the housing and defines a prime chamber. A prime piston is disposed within the prime chamber and is movable between a closed position seated against a valve seat and an open position received within the prime chamber. A check valve diaphragm assembly is disposed within the housing and disposed against the prime chamber housing in a closed position and spaced from the prime chamber housing in an open position.

20 Claims, 3 Drawing Sheets

U.S. PATENT DOCUMENTS

| | | | |
|---|---|---|---|
| 2,788,192 A * | 4/1957 | Mountford | 251/63.5 |
| 2,931,378 A * | 4/1960 | Davies | 137/220 |
| 3,119,405 A * | 1/1964 | Guy | 137/219 |
| 3,125,115 A * | 3/1964 | Gard | 137/220 |
| 3,178,119 A * | 4/1965 | Thorson | 239/570 |
| 3,309,028 A * | 3/1967 | Zieg et al. | 239/498 |
| 3,362,424 A * | 1/1968 | Smith et al. | 137/220 |
| 3,473,612 A | 10/1969 | Poitras | |
| 3,556,128 A | 1/1971 | Scaglione | |
| 3,575,376 A | 4/1971 | Arvidson, Jr. | |
| 3,623,696 A | 11/1971 | Baumann | |
| 3,864,031 A | 2/1975 | Hossfeld et al. | |
| 3,885,771 A | 5/1975 | Baumann | |
| 3,905,382 A * | 9/1975 | Waterston | 137/102 |
| 3,974,849 A | 8/1976 | Dawson | |
| 4,013,089 A * | 3/1977 | Braukmann | 137/218 |
| 4,073,473 A | 2/1978 | Rihm et al. | |
| 4,080,981 A | 3/1978 | Stewart | |
| 4,256,285 A | 3/1981 | Davidson | |
| 4,285,495 A * | 8/1981 | King | 251/63.5 |
| 4,359,098 A * | 11/1982 | Johnson | 169/90 |
| 4,519,579 A | 5/1985 | Brestel et al. | |
| 4,640,492 A | 2/1987 | Carlson, Jr. | |
| 4,658,852 A * | 4/1987 | Weingarten | 137/218 |
| 4,706,706 A | 11/1987 | Page et al. | |
| 4,749,003 A | 6/1988 | Leason | |
| 5,244,011 A | 9/1993 | Feldinger et al. | |
| 5,280,872 A * | 1/1994 | Yamanaka | 251/61.5 |
| 5,305,987 A | 4/1994 | Baumann | |
| 5,421,366 A * | 6/1995 | Naffziger et al. | 137/614.2 |
| 5,634,626 A | 6/1997 | Hartman | |
| 5,822,984 A | 10/1998 | Park et al. | |
| 5,931,233 A | 8/1999 | La Bonte et al. | |
| 5,934,645 A | 8/1999 | Calvin | |
| 5,971,080 A | 10/1999 | Loh et al. | |
| 5,979,565 A | 11/1999 | Wicks et al. | |
| 5,992,532 A | 11/1999 | Ramsey et al. | |
| 6,068,057 A | 5/2000 | Beukema | |
| 6,079,449 A * | 6/2000 | Gerber | 137/859 |
| 6,557,645 B1 | 5/2003 | Ringer | |
| 6,766,835 B1 | 7/2004 | Fima | |
| 6,810,963 B2 | 11/2004 | Ringer | |
| 6,848,513 B2 | 2/2005 | Jackson et al. | |
| 2002/0011342 A1 | 1/2002 | Reilly | |
| 2006/0272830 A1 | 12/2006 | Fima | |
| 2007/0000671 A1 * | 1/2007 | Reilly et al. | 169/17 |
| 2007/0017209 A1 * | 1/2007 | Welker | 60/228 |

* cited by examiner

DRY VALVE FOR SPRINKLER SYSTEM

CROSS-REFERENCE TO RELATED APPLICATIONS

This application claims the benefit of U.S. Provisional Application No. 61/049,081, filed on Apr. 30, 2008, the disclosure of which is incorporated herein by reference.

FIELD

The present disclosure relates to fire suppressant sprinkler systems and more particularly, to a dry valve for a sprinkler system.

BACKGROUND

The statements in this section merely provide background information related to the present disclosure and may not constitute prior art.

Automatic fire protection sprinkler systems are used to protect property and life from damage and loss due to fires. The types of systems that are currently used for fire protection include wet systems that include pressurized liquid throughout the piping system using a system check valve and flow alarm. These systems operate due to heat activation of a fusable heat activated link or glass bulb of the sprinkler allows the release of a plug that permits the flow of liquid or fire suppressant until the sprinkler system is manually shut off.

A dry system is one that flows water when the sprinkler head is opened. A dry system is typically supplied with pressurized air. The water pressure is stopped at the valve by a clapper that is typically held closed by air pressure or a mechanism that is air actuated. When the air pressure is reduced by means of an open sprinkler head, the valve will open and flow water. The size differential ratio for the downstream surface area of the valve member, as compared to the upstream surface area of a dry system valve, is typically in a range between five to one and seven to one, though it could be more per specific standards.

A preaction system is typified by its name. An action must occur before the system is activated. In the case of a single interlocked electric release preaction, a heat detector will trip the valve and release water into the system. Prior to water flowing from the sprinkler system, the sprinkler head must also operate. Likewise, if the sprinkler head operates, the heat detector must still operate before water will flow from the sprinkler system. There are many types of preaction systems. There are non-interlocked (very similar to dry), single interlocked, and double interlocked. The same principle is applied for each one in that there is one or more actions required before water flows from a sprinkler head that has operated. The system in static condition is typically full of air pressure but may also be supervised by another type of medium, such as water, propylene glycol, or nitrogen.

A preaction system that includes supervision of discharge system integrity using air, is typically designed for industrial or commercial applications. Dry preaction systems currently exist in which an air maintenance system provides supervision of the piping system integrity. The benefit of a dry preaction system is that because the piping network is free from water, the risk of pipe freezing is eliminated.

Some dry preaction systems currently available use a flow control valve held closed by system supply liquid pressure. However, these flow control valves require an external check valve, require the removal of a hand-hole cover to reset and latch the valve closed, have a complex design and are large and take up a lot of space. Accordingly, it is desirable in the art to provide a less complex dry and/or dry preaction control valve for a sprinkler system that has an integrated check valve, that is externally resettable, and has a smaller construction.

SUMMARY

A dry valve is provided for a sprinkler system, including a housing including a valve body having an inlet end and a valve cover having an outlet end. A prime chamber housing is disposed within the housing and defines a prime chamber. A prime piston is disposed within the prime chamber and is movable between a closed position seated against a valve seat and an open position received within the prime chamber. A check valve diaphragm assembly is disposed within the housing and disposed against the prime chamber housing in a closed position and spaced from the prime chamber housing in an open position. The inlet end of the housing and the prime chamber are supplied with water at a common pressure in order to hold the prime piston in a closed position. Because of the common pressure supplied to the inlet end of the housing and the prime chamber, the size of the prime piston can be reduced as compared to prior art designs that use air pressure to hold a dry valve in a closed position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
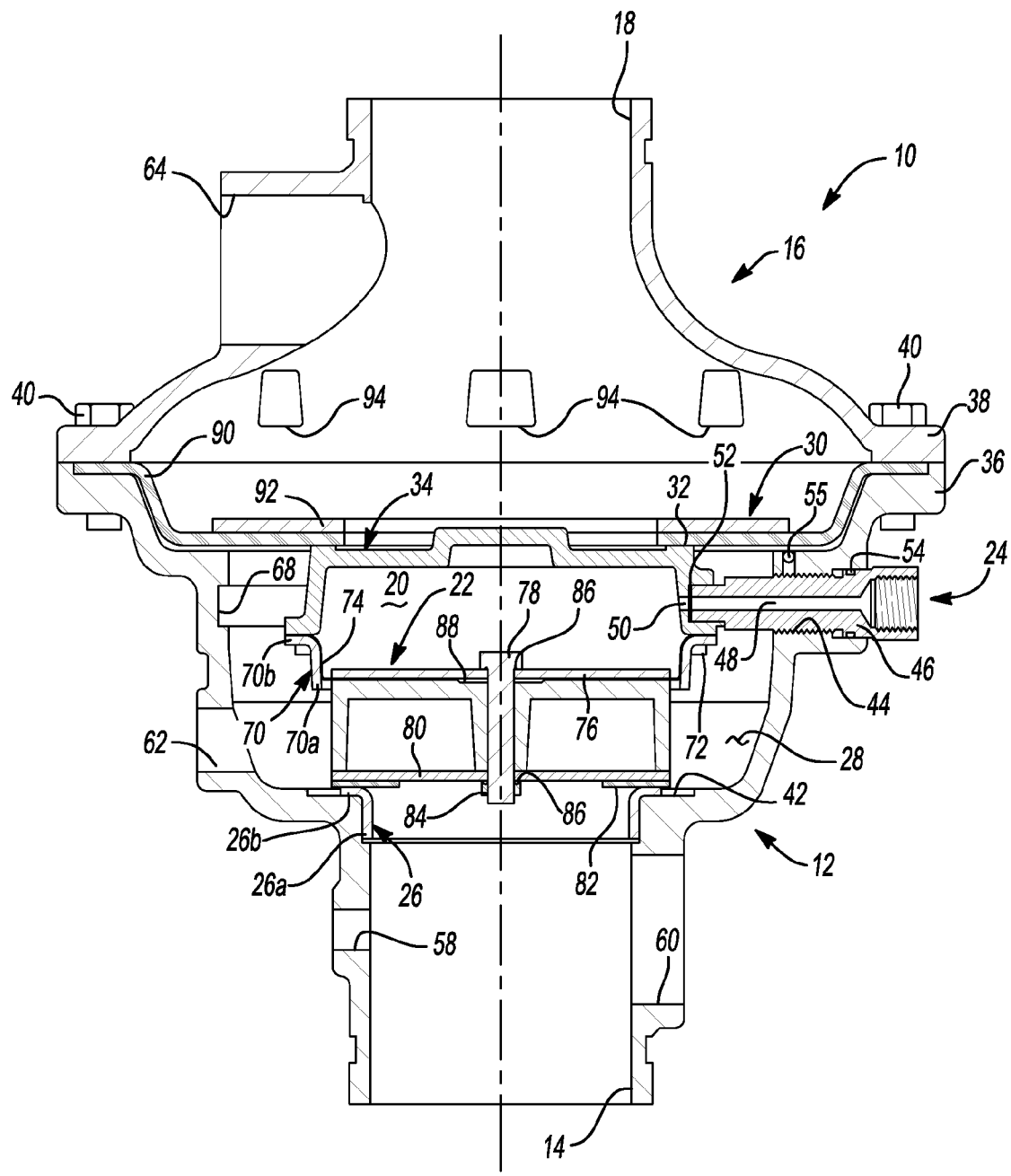
FIG. 1 is a cross-sectional view of a dry valve for a sprinkler system shown in a closed position according to the principles of the present disclosure.

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, the dry valve 10 for use with a sprinkler system will now be described. The dry valve 10 includes a valve body 12 having an inlet end 14 for connection to a water supply. A valve cover 16 is mounted to the valve body 12 and includes an outlet end 18 which is connected to a sprinkler system, as is known in the art. A prime chamber 20 is provided in the valve 10 for receiving a prime piston 22 therein. The prime chamber 20 is connected to a prime chamber inlet 24 that supplies pressurized fluid to the prime chamber for pressing the prime piston 22 against a valve seat 26 for closing off the water supply to the sprinkler system. An intermediate chamber 28 is provided in surrounding relation to the prime chamber 20. A self-resetting encapsulated check valve diaphragm assembly 30 engages a seat surface 32 provided on a prime chamber housing 34 and is pressed thereagainst.

The valve body 12 includes the inlet end 14, the intermediate chamber portion 28, and a radially outwardly extending mounting flange 36 which is adapted to be mounted to a corresponding radially outwardly extending mounting flange 38 of the valve cover 16. The mounting flange 36 is provided with a plurality of internally threaded apertures, while the mounting flange 38 of the valve cover 16 is provided with corresponding apertures that are designed to receive screws 40 for fastening the valve cover 16 to the valve body 12. Alternatively, the body 12 and cover 16 can be secured together by a grooved pipe clamp.

The valve body 12 includes an internal shoulder portion 42 disposed between the inlet 14 and intermediate chamber 28 and receives the valve seat 26 thereagainst. The valve seat 26 can be made from sheet metal and defines an annular ring having a generally L-shaped cross section with one leg portion 26a extending axially toward the inlet 14 and a radially outwardly extending leg portion 26b resting against the shoulder 42 and defining a valve seat surface.

The valve body 12 includes an internally threaded aperture 44 for receiving a coupling 46 that provides communication between a prime fluid line (not shown) and the prime chamber 20. The coupling 46 can have external threads engaged with the internally threaded aperture 44 and has an end portion 48 which communicates with an aperture 50 extending through the prime chamber housing 34 in communication with the prime chamber 20. An O ring 52 can be provided between the end portion 48 of coupling 46 and the aperture 50 to provide a sealed fluid connection therebetween. The coupling 46 can also be provided with a recessed annular groove for receiving an O ring 54 for providing a sealed connection with the aperture 44 in the valve body 12.

A set screw 55 can be used to secure the coupling 46 in place. The valve body 12 can further be provided with additional apertures 58, 60, that are in communication with the inlet and 14 and can be utilized for providing a connection to a pressure gauge or to other supply lines. In addition, the intermediate chamber portion 28 of the valve body 12 can also be provided with a communication passage 62 that can be provided with a communication to atmospheric pressure so that the intermediate chamber 28 does not become pressurized. The valve cover 16 can also be provided with an aperture 64 which can be utilized as a drain port for draining the system after the valve is tripped and/or can be connected to a system air pressure gauge or a water detection device. The size of aperture 64 can be selected for achieving a desired drainage rate.

Figure 4:
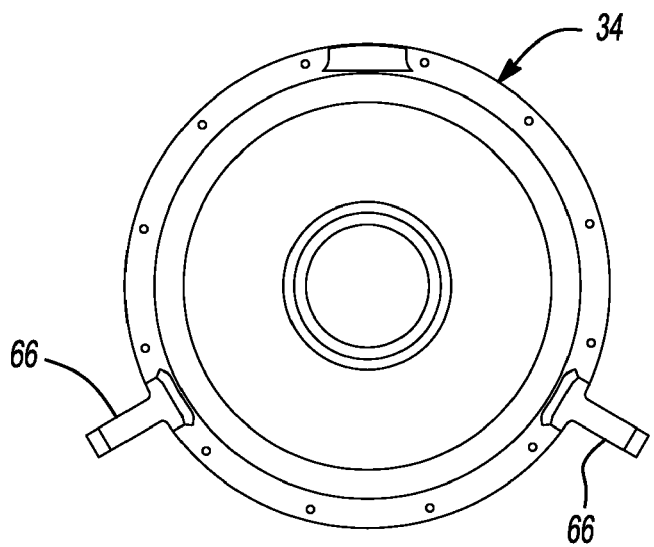
FIG. 4 is top plan view of the prime chamber housing according to the principles of the present disclosure.

The prime chamber 20 and prime piston 22 can be provided as a sub-assembly that can be removable and replaceable. The prime chamber housing 34 is shown in FIG. 4 and can include one or more leg members 66 extending radially therefrom for engagement with an annular groove 68 on the interior surface of the valve body 12. The legs 66 can be received in the annular groove 68 while the coupling 46 provides an additional mounting feature that fixes the prime chamber housing 34 in a suspended position within the valve body 12. A prime cover 70 is mounted to the prime chamber housing 34 and defines an annular ring having a generally L-shaped cross section with an axially extending leg portion 70a and a radially outwardly extending flange portion 70b. The radially outwardly extending flange portion 70b can be provided with a plurality of apertures therein for receiving threaded fasteners 72 therethrough that threadedly engage threaded apertures (not shown) provided in the bottom surface of the prime chamber housing 34.

A rolling diaphragm 74 has a perimeter portion sandwiched between the prime chamber housing 34 and the prime cover 70. The rolling diaphragm 74 is connected to the prime piston 22. A function of the rolling diaphragm 74 is to seal the prime chamber pressure and to eliminate or reduce the friction between the prime piston 22 and prime cover 70. The prime piston 22 has a piston retainer disk 76 mounted thereto on an opposite side of the rolling diaphragm 74 from the prime piston. An aperture is provided in the piston retainer disk 76 as well as the rolling diaphragm 74 and prime piston 22 to receive a fastener therethrough that also secures an encapsulating plate 80 to the prime piston 22. The encapsulating plate 80 supports a valve seal ring 82 on a lower surface thereof for seating against valve seat. A nut 84 is secured to the fastener 78 extending through the piston retainer disk 76, rolling diaphragm 74, prime piston 22, and encapsulating plate 80. An O-ring seal 86 can be utilized at opposite ends of the fastener to ensure no water leakage through the piston assembly. In addition, a rubber washer 88 can be provided surrounding the fastener 78 and disposed against the rolling diaphragm 74 to further provide a seal connection therebetween.

The check valve diaphragm assembly 30 includes a check diaphragm 90 having an outer perimeter clamped between the mounting flanges 36, 38 of the valve body 12 and valve cover 16, respectively. A check retainer ring 92 is secured to the check diaphragm 90. The check retainer ring 92 and check diaphragm 90 each have an inside diameter which is smaller than a diameter of the seat surface 32 so that the check diaphragm 90 and check retainer ring 92 overlap the seat surface 32 of the prime chamber housing 34. The check diaphragm 90 is configured to press the check valve diaphragm assembly 30 against the valve seat surface 32 to provide an air tight connection therebetween.

During operation, the prime chamber inlet 24 supplies pressurized fluid to the prime chamber 20 which acts on the rolling diaphragm 74 and prime piston 22 to cause the valve seal 82 mounted to the prime piston to positively seat against the valve seat 26 providing a fluid tight connection to close off the water supply through the inlet 14 of the valve body 12. The prime chamber 20 can be supplied with water at generally the same pressure as the inlet end 14 of the valve 10. The exposed surface area of the prime piston 22 is larger on the prime chamber side than on the water supply side so that the prime piston 22 is held closed due to the size differential. The ratio of the size differential between the exposed surface area on the prime chamber side and the exposed surface area on the water supply side can be less than 3 to 1 and preferably as low as approximately 1.2 to 1 to allow for a compact prime chamber and, therefore, a compact valve design. Air, water, or other pressurized mediums can alternatively be supplied to the prime chamber for holding the prime piston closed. The configuration of the diaphragm 90 of check valve diaphragm assembly 30 causes the check valve diaphragm assembly 30 to press against the seat surface 32 for providing an air tight connection therebetween.

Figure 2:
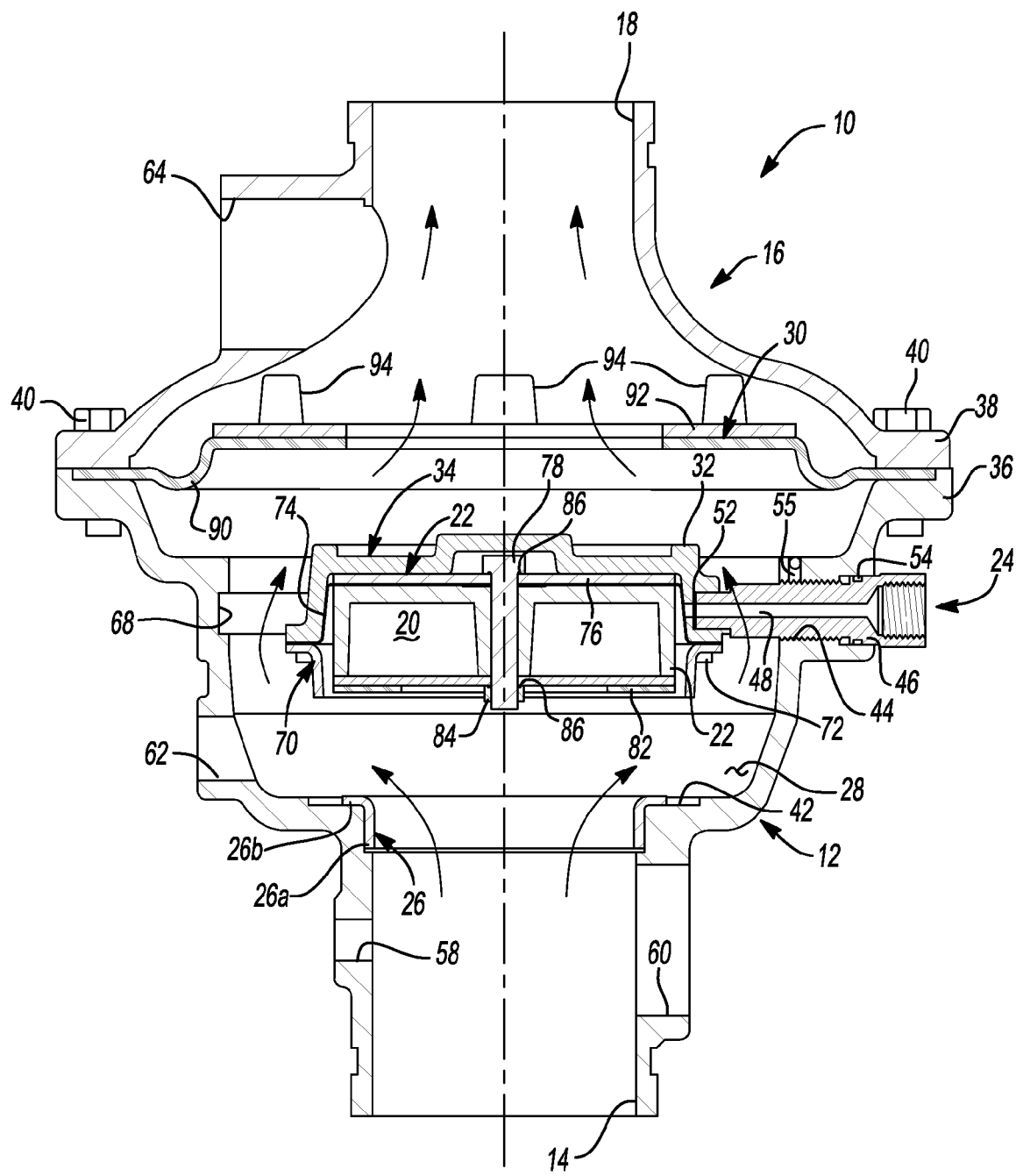
FIG. 2 is a cross-sectional view of the dry valve of FIG. 1 shown in an open position.
Figure 3:
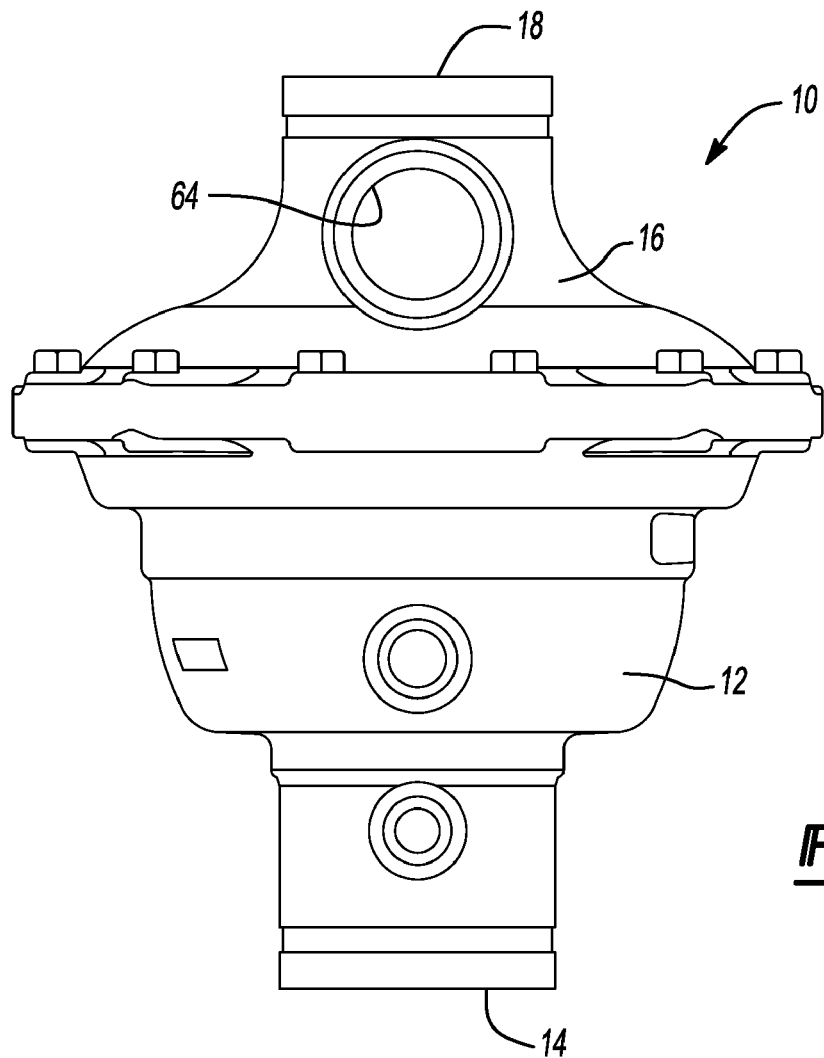
FIG. 3 is a side plan view of the dry valve of FIG. 1.

As shown in FIG. 2, upon release of prime pressure to the prime chamber 20 which can be controlled by pilot valves in response to detected conditions of the sprinkler system, the prime piston 22 moves upward into the prime chamber 20 as allowed by the rolling diaphragm 74. The water supply to inlet 14 then is allowed to flow into the intermediate chamber 28 and presses upward against the check valve diaphragm 30 causing the check valve diaphragm assembly 30 to open in an upward direction and allow the water supply to flow through the outlet 18 of the dry valve 10 to the sprinkler system. The valve cover 16 can include a plurality of radially inwardly protruding stops 94 against which the check valve diaphragm assembly 30 is disposed in an open position.

The system can be reset by turning off the water supply to the control valve 10. A supply of pressurized air to the sprinkler system will then act upon the check valve diaphragm assembly 30 to cause the check valve diaphragm assembly 30 to positively seat in its closed position. Then, water or other pressurized fluid can be supplied to the prime chamber inlet 24 to cause the prime piston 22 to move toward the valve seat 26 to cause the valve seal 82 to positively seal thereagainst. The water supply to inlet 14 then can be opened up so that the system is reset without having to internally reset any of the valve components. With the system of the present disclosure, the check valve is internal to the dry valve system 10 and, therefore, reduces the amount of space required for assembly of the sprinkler system fixture. The valve 10 is also simplified as compared to current designs and is smaller, allowing it to be installed in smaller spaces with smaller or lower clearances. The valve 10 can be used with both dry or dry preaction sprinkler systems. The valve 10 is provided with a prime chamber 20 in the middle of the flow area that feeds the system so that water flows all around the prime chamber 20 when the valve 10 is opened. This arrangement keeps the valve small and allows for the application of the internal check valve 30 that seats against the seat surface 32 on the downstream side of the prime chamber housing 34. Thus, the prime chamber housing 34 can provide dual purposes for providing a prime chamber 20 and a seat surface for the check valve 30, thus allowing for a compact valve design.

What is claimed is:

1. A dry valve for a sprinkler system, comprising:
a housing having an inlet end and an outlet end and a passage therebetween;
a prime chamber housing disposed within said housing and defining a prime chamber in communication with a prime chamber inlet and fluidly isolated from said passage, said prime chamber housing including a generally flat planar first valve seat on a downstream face of said prime chamber housing;
a prime piston disposed within said prime chamber, said prime piston being movable between a closed position seated against a second valve seat in response to a supply of fluid to said prime chamber inlet and an open position received within said prime chamber in response to an interruption in said supply of fluid to said prime chamber inlet;
a check valve assembly disposed within said passage in said housing and movable between a closed position and an open position, said check valve assembly being disposed against said generally flat planar first valve seat of said prime chamber housing in said closed position, wherein said inlet end of said housing and said prime chamber inlet are supplied with water at a common pressure and said outlet end and check valve assembly are supplied with air at a predetermined pressure.

2. The dry valve according to claim 1, wherein said prime piston has a surface area exposure on said prime chamber side that is less than 3 times a surface area exposure on said second valve seat side.

3. The dry valve according to claim 1, wherein in said closed position, said prime piston has a surface area exposure on said prime chamber side that is approximately 1.2 times a surface area exposure on said second valve seat side.

4. The dry valve according to claim 1, wherein said check valve assembly includes a diaphragm having a perimeter portion connected to said housing and a retainer ring connected to an inner perimeter of said diaphragm, said retainer ring overlapping said generally flat planar first valve seat when said check valve assembly is in said closed position and said retainer ring having an inner opening therein that is smaller than a diameter of said generally flat planar first valve seat.

5. The dry valve according to claim 1, wherein said prime piston is connected to said prime chamber housing by a diaphragm.

6. The dry valve according to claim 1, wherein said prime piston supports a valve seal ring for seating against said second valve seat.

7. The dry valve according to claim 1, wherein said prime chamber housing is supported in said housing by a plurality of radially extending legs.

8. The dry valve according to claim 7, wherein said plurality of radially extending legs are received in a groove in a sidewall of said housing.

9. The dry valve according to claim 7, further comprising a coupling fluidly connected with said prime chamber.

10. The dry valve according to claim 4, wherein said housing includes a plurality of protruding stops spaced downstream of said generally flat planar first valve seat for engaging said check valve assembly in an open position.

11. A dry valve for a sprinkler system, comprising:
    a housing including a valve body having an inlet end and a valve cover having an outlet end and a passage extending between said inlet end and said outlet end;
    a prime chamber housing disposed within said housing and defining a prime chamber in communication with a prime chamber inlet and fluidly isolated from said passage, said prime chamber housing including a generally flat planar first valve seat on a downstream face of said prime chamber housing;
    a prime piston disposed within said prime chamber, said prime piston being movable between a closed position seated against a second valve seat in response to a supply of fluid to said prime chamber inlet and an open position received within said prime chamber in response to an interruption in said supply of fluid to said prime chamber inlet;
    a check valve diaphragm assembly disposed within said housing and disposed against said generally flat planar first valve seat of said prime chamber housing in a closed position and spaced from said prime chamber housing in an open position, wherein said inlet end of said housing and said prime chamber inlet are supplied with water at a common pressure and said outlet end and check valve assembly are supplied with air at a predetermined pressure.

12. The dry valve according to claim 11, wherein said prime piston has a surface area exposure on said prime chamber side that is less than 3 times a surface area exposure on said second valve seat side.

13. The dry valve according to claim 11, wherein in said closed position, said prime piston has a surface area exposure on said prime chamber side that is approximately 1.2 times a surface area exposure on said second valve seat side.

14. The dry valve according to claim 11, wherein said check valve diaphragm assembly includes a diaphragm having a perimeter portion connected to said housing and a retainer ring connected to an inner perimeter of said diaphragm, said retainer ring overlapping said generally flat planar first valve seat when said check valve assembly is in said closed position and said retainer ring having an inner opening therein that is smaller than a diameter of said generally flat planar first valve seat.

15. The dry valve according to claim 11, wherein said prime piston is connected to said prime chamber housing by a diaphragm.

16. The dry valve according to claim 11, wherein said prime piston supports a valve seal ring for seating against said second valve seat.

17. The dry valve according to claim 11, wherein said prime chamber housing is supported in said housing by a plurality of radially extending legs.

18. The dry valve according to claim 17, wherein said plurality of radially extending legs are received in a groove in a sidewall of said housing.

19. The dry valve according to claim 17, further comprising a coupling fluidly connected with said prime chamber.

20. The dry valve according to claim 11, wherein said housing includes a plurality of protruding stops spaced downstream of said generally flat planar first valve seat for engaging said check valve diaphragm assembly in an open position.

* * * * *